United States Patent
Tseng et al.

(10) Patent No.: US 8,703,640 B2
(45) Date of Patent: Apr. 22, 2014

(54) METHOD FOR PREPARING NANO-SCALE PLATINUM

(71) Applicant: National Tsing Hua University, Hsinchu (TW)

(72) Inventors: Fan-Gang Tseng, New Taipei (TW); Yi-Shiuan Wu, Hsinchu (TW); Shin-Mei Gong, Taoyuan County (TW); Chun-Hsien Wang, Taipei (TW)

(*) Notice: Subject to any disclaimer, the term of this patent is extended or adjusted under 35 U.S.C. 154(b) by 0 days.

(21) Appl. No.: 13/683,294

(22) Filed: Nov. 21, 2012

(65) Prior Publication Data
US 2014/0018233 A1    Jan. 16, 2014

(30) Foreign Application Priority Data
Jul. 13, 2012 (TW) .............................. 101125466 A

(51) Int. Cl.
*B01J 23/42* (2006.01)
*B01J 37/16* (2006.01)
*B82Y 30/00* (2011.01)

(52) U.S. Cl.
CPC .............. *B01J 37/16* (2013.01); *B82Y 30/00* (2013.01); *Y10S 977/742* (2013.01); *Y10S 977/81* (2013.01); *Y10S 977/896* (2013.01)
USPC ........... 502/185; 502/325; 502/326; 977/742; 977/810; 977/896; 977/742

(58) Field of Classification Search
USPC ................................... 502/325, 326; 977/742
See application file for complete search history.

(56) References Cited

U.S. PATENT DOCUMENTS

2011/0014550 A1* 1/2011 Jiang et al. .................... 429/528

OTHER PUBLICATIONS

Wu (Highly efficient platinum nanocatalysts synthesized by an open-loop reduction system with a controlled temperature loop, Electrochimia Acta 64 (2012) 162-170).*

* cited by examiner

*Primary Examiner* — Jun Li
(74) *Attorney, Agent, or Firm* — Saliwanchik, Lloyd & Eisenschenk

(57) ABSTRACT

The invention discloses a preparation method of nano-scale platinum (Pt) using an open-loop reduction system. The preparation method comprises the steps of: utilizing carbon nanotubes (CNTs) as a catalyst support; mixing platinum salt with a reducing agent and deionized water to form a precursor solution in a flask; heating the precursor solution in the flask at a predetermined temperature range to reduce nano-scale platinum nanoparticles on the carbon nanotubes by the process of water evaporation; allowing the water vapor to flow through a connection tube to a condenser; filling a cooling substance into the condenser via the first opening and draining the cooling substance from the condenser via the second opening to lower the temperature of the water vapor in the inner tube by the cooling substance and condense the water vapor into liquid water, which is collected with a beaker placed under the condenser.

10 Claims, 7 Drawing Sheets

METHOD FOR PREPARING NANO-SCALE PLATINUM

CROSS-REFERENCE TO RELATED APPLICATION

This application claims the benefit under 35 U.S.C. §119 of Taiwanese Patent Application No. 101125466, filed Jul. 13, 2012, which is hereby incorporated by reference in its entirety.

BACKGROUND

1. Field of the Invention

The present invention is related to a method for preparing nano-scale platinum (Pt), and particularly to the method for preparing nano-scale platinum that uses removing water and increasing the concentration of a precursor solution through heating, such that the reduction of platinum would be accelerated so as to obtain the small particle-sized and uniformly-dispersed nano-scale platinum on carbon nanotubes (CNTs) with improved electrocatalytic preferential orientation facets and superior electrochemical properties.

2. Description of the Related Art

Currently, the depletion of natural resources and environmental protection have become urgent issues, and thus related scientists and researchers all over the world spare no effort to find feasible solutions for environmental pollution and alternative energy resources with high conversion efficiency. The principle of fuel cells converts chemical energy to electrical energy by using redox reactions. Compared with other kinds of environmental energies, fuel cells have the advantages of high conversion efficiency, strong mobility, adaption of various different fuels as well as free of pollution.

Due to the features of nano materials including small size, large specific surface area, high surface energy and high proportion of surface atoms, the metal nano materials are characterized in that the surface effects, small size effects and tunneling effects of nanotechnology can be applied extensively in different fields. Therefore, finding a way of preparing nano materials with a homogeneous and large surface area efficiently becomes an important subject for scientists. For fuel cells, platinum is mainly used as a catalyst in an electrochemical reaction. In prior art, nano-scale platinum is prepared by a hermetic reflux system. As shown in FIG. 1, the hermetic reflux system 1 comprises a flask 11, a condenser 12 and a pressure regulator 13. Platinum salt, a reducing agent and deionized water are mixed to form a precursor solution in the flask 11. The precursor solution in the flask 11 is heated at a predetermined temperature (such as 160° C.). Then, the water in the precursor solution boils and evaporates to become water vapor by the heating process. The water vapor is passed into the inner tube of the condenser 12 and cooled and condensed into a liquid by a cooling substance which flows into the condenser and around the outside of the inner tube. Pressure generated during the water evaporation process can be controlled by the pressure regulator 13 mounted on the system. Next, the liquid in the condenser 12 is returned to the flask 11 to maintain the water content in the precursor solution. At the same time, the nano-scale platinum in the precursor solution in the flask 11 is gradually reduced on the carbon nanotubes.

However, the preparation of the nano-scale platinum using the conventional hermetic reflux system takes about 4 hours and requires a hermetic system with the pressure regulation function. Currently, superior electrochemical properties of the prepared nano-scale platinum used as an electrode catalyst in fuel cells are required in a time-efficient way. Therefore, it is necessary to develop a simplified method for preparing nano-scale platinum with small size, highly homogeneous distribution, enhanced electrocatalytic preferential orientation facets and superior electrochemical properties to solve the problems of a long preparation time, a complicated reduction system and poor electrochemical properties of the platinum electrode catalysts.

BRIEF SUMMARY

In view of the foregoing problems of the prior art, the objective of the present invention is to provide a method for preparing nano-scale platinum, in order to solve the aforementioned problems such as a long reduction time and a complicated hermetic system with the pressure regulation function for preparing the nano-scale platinum, and the enhancement of poor electrochemical properties of the obtained platinum electrode catalysts.

According to the objective of the present invention, a method for preparing nano-scale platinum in accordance with the present invention is provided, and it comprises the steps of:

Utilizing carbon nanotubes as a catalyst support; mixing platinum salt with a reducing agent and deionized water to form a precursor solution in a flask; heating the precursor solution in the flask at a predetermined temperature range to reduce nano-scale platinum particles on the carbon nanotubes by the process of water evaporation.

Preferably, the condenser has an inner tube, a first (lower) opening and a second (upper) opening, and the method further comprises a step of:

allowing the water vapor to flow through a connection tube to the inner tube of a condenser; filling a cooling substance into the condenser via the first opening and draining the cooling substance from the condenser via the second opening to lower the temperature of the water vapor in the inner tube by the cooling substance and condense the water vapor into liquid water, which is collected with a beaker placed under the condenser.

Preferably, the predetermined temperature range is from 110 to 160° C.

Preferably, the reduction time of the nano-scale platinum is less than 1.5 hours.

Preferably, the mass activity (MA) of the nano-scale platinum is 435 A $g_{Pt}^{-1}$.

Preferably, the charge transfer resistance (Rct) of the nano-scale platinum is less than 30 $\Omega$-cm$^2$.

Preferably, the average diameter of the nano-scale platinum particles is 3.6±0.4 nm.

Preferably, the mass density ($M_{Pt}$) of the nano-scale platinum is less than 0.2 mg cm$^{-2}$.

Preferably, the particle size distribution of the nano-scale platinum is between 2.0 to 5.5 nm.

Preferably, the reducing agent includes formaldehyde, parafonnaldehyde, sodium borohydride, sodium thiosulfate, sodium sulfite, ethanol, ethylene glycol, citric acid or glucose.

With the aforementioned description, the method for preparing nano-scale platinum in accordance with the present invention has one or more of the following advantages:

(1) In the method for preparing nano-scale platinum, the water in the precursor solution including platinum salt, the reducing agent and deionized water boils and evaporates to become water vapor by heating, thereby increasing the concentration of the reducing agent in the precursor solution. Thus, the reduction of the nano-scale platinum would be accelerated. The reduction time of preparing nano-scale platinum using the method of the present invention can be less than 1.5 hours, which shortens the reduction time by at least 50% compared to the prior art.

(2) The nanoparticles with small size and uniform dispersion on carbon nanotubes would be obtained by gradually increasing the concentration of the reducing agent in the precursor solution according to the method of the invention.

(3) The nano-scale platinum prepared by the method of the present invention at the predetermined temperature (such as 130° C.) can obtain a higher proportion of the electrocatalytic preferential orientation facets Pt (111) than those at different temperatures, promoting a maximum mass activity and a minimum charge transfer resistance for the oxidation reaction of fuel. Also, the nano-scale platinum can provide improved electrochemical properties when applied as electrode catalysts in fuel cells.

These and other objects and advantages of the present invention will become readily apparent upon reading the following detailed description and preferred embodiments.

DETAILED DESCRIPTION

Figure 1:
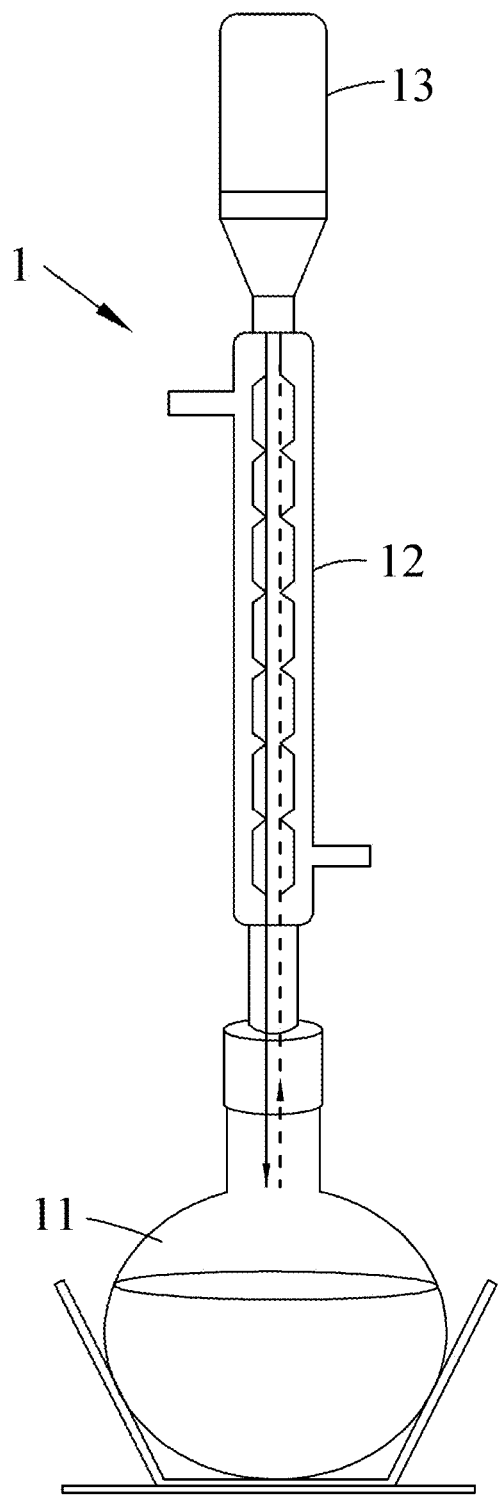
FIG. 1 is a schematic view of a method for preparing nano-scale platinum in accordance with the prior art.

For the benefit of understanding the technical characteristics, contents and advantages of the present invention, the present invention is described in detail by the following examples and drawings. The drawings attached herein are only used to illustrate and accessorily explain the principle of the present invention, not to show the real configurations and ratios of the elements or devices according to the present invention. Therefore, the scope of the claimed invention should not be limited to the ratios and configurations of the devices/elements in the embodiments and drawings below.

The exemplary embodiments of a method for preparing nano-scale platinum in accordance with the present invention is more specifically described in the following paragraphs by referring to the drawings attached only by way of examples. For convenience of understanding the principles of the invention, the same elements/components having same functions or structures in any of the following examples are marked as the same numbers or symbols.

Figure 2:
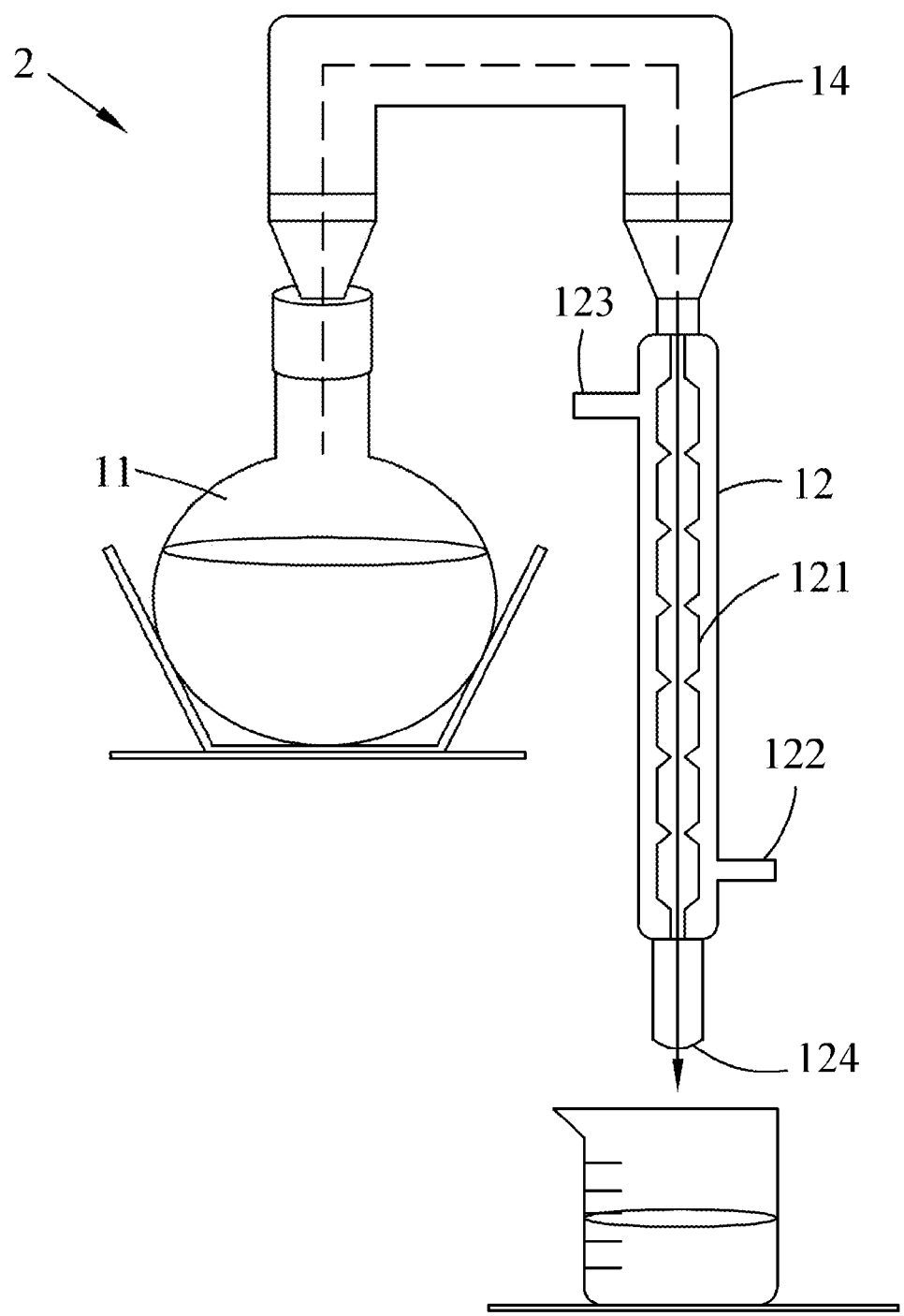
FIG. 2 is a first schematic view of an embodiment of a method for preparing nano-scale platinum in accordance with the present invention.

With reference to FIG. 2, it is a first schematic diagram of an embodiment of a method for preparing nano-scale platinum in accordance with the present invention. The preparation of the nano-scale platinum is carried out via an open-loop reduction system 2. The open-loop reduction system 2 comprises a flask 11, a condenser 12 and a connection tube 14. Platinum salt is mixed with a reducing agent and deionized water to form a precursor solution and carbon nanotubes are then put into the flask 11. The carbon nanotubes are used as a catalyst support. In one aspect, the platinum salt includes but not limited to chloroplatinic acid, and the reducing agent includes but not limited to formaldehyde, paraformaldehyde, sodium borohydride, sodium thiosulfate, sodium sulfide, ethanol, ethylene glycol, citric acid or glucose, and preferably ethylene glycol. In one aspect, the condenser 12 includes but not limited to an air condenser, a Liebig condenser, an Allihn condenser or a coil condenser, and preferably the Liebig condenser. The condenser 12 comprises an inner tube 121, a first opening 122, a second opening 123 and an output opening 124. The flask 11 is connected to one end of the connection tube 14, and the condenser 12 is connected to the other end of the connection tube 14 relative to the flask 11.

After chloroplatinic acid, ethylene glycol and deionized water are heated at a temperature range between 110° C. and 160° C., the water in the precursor solution starts to boil and evaporate to become water vapor, and then the water vapor flow through the connection tube 14 to the inner tube 121 of the condenser 12. The first opening 122 of the condenser 12 is used to input a cooling substance, and the cooling substance passes through the condenser 12 and flows out of the condenser 12 via the second opening 123. In one aspect, the cooling substance includes but not limited to water. The temperature of the water vapor in the inner tube 121 cools down by the cooling substance flowing around the external side wall of the inner tube 121, such that the water vapor is condensed into liquid water. The liquid water flows out of the condenser 12 through the output opening 124 without returning back to the flask 11. When the water in the flask 11 boils and evaporates to become water vapor during the process of heating the flask 11, the concentration of ethylene glycol in the precursor solution in the flask 11 is simultaneously increased, and the platinum is also reduced on the carbon nanotubes, thereby achieving the objective of preparing the nano-scale platinum more quickly at elevated temperature. In one aspect, the reduction time of preparing the nano-scale platinum is preferably less than 1.5 hours.

Figure 3:
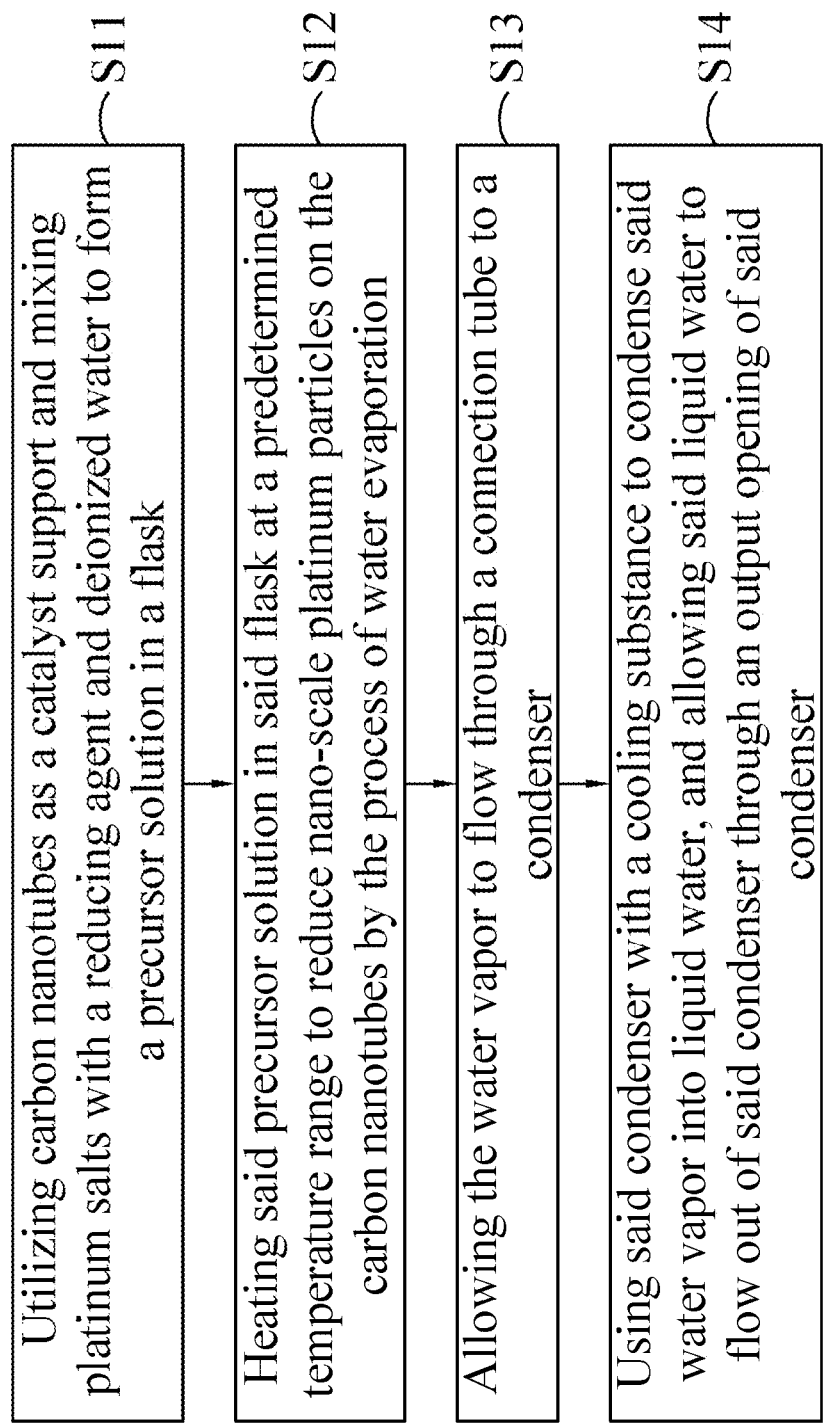
FIG. 3 is a flow chart of a method for preparing nano-scale platinum in accordance with the present invention.

With reference to FIG. 3 for a flow chart of an embodiment of a method for preparing nano-scale platinum in accordance with the present invention, the method comprises the following steps of:

S11: Utilizing carbon nanotubes as a catalyst support; mixing platinum salt with a reducing agent and deionized water to form a precursor solution in a flask. In one aspect, the platinum salt includes but not limited to chloroplatinic acid. The reducing agent includes but not limited to formaldehyde, paraformaldehyde, borohydride, sodium thiosulfate, sodium sulfide, ethanol, ethylene glycol, citric acid or glucose, and preferably ethylene glycol.

S12: Heating said precursor solution in the flask at a predetermined temperature range to reduce nano-scale platinum particles on the carbon nanotubes by the process of water evaporation. In one aspect, the predetermined temperature range is from 110 to 160° C.

S13: Allowing the water vapor to flow through a connection tube to a condenser.

S14: Using said condenser with a cooling substance to condense said water vapor into liquid water, and allowing said liquid water to flow out of said condenser through an output opening of said condenser. In one aspect, the concentration of ethylene glycol in the precursor solution is gradually increased when the water in the flask evaporates, and the reduction time of preparing the nano-scale platinum is shortened. In one aspect, the reduction time of preparing the nano-scale platinum is preferably less than 1.5 hours.

Figure 4:
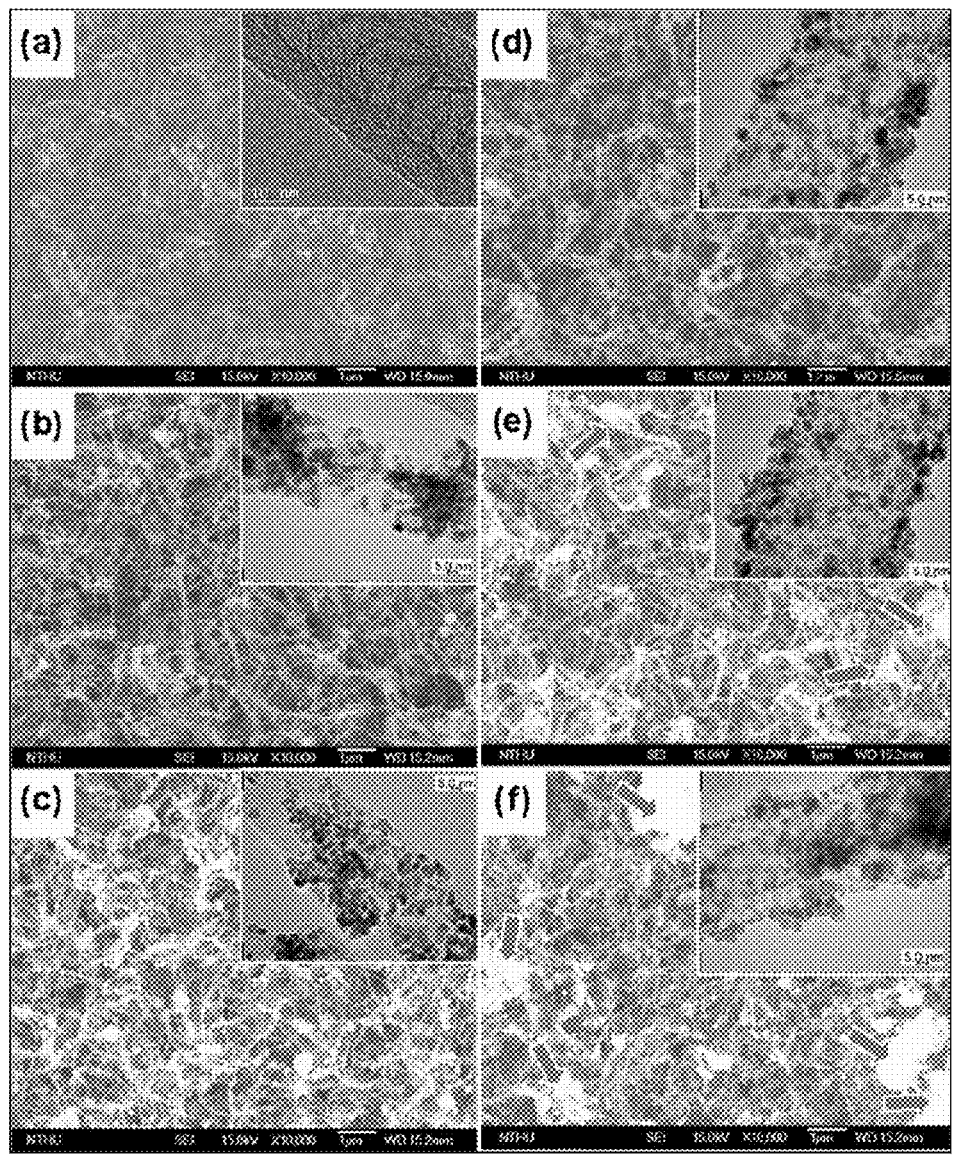
FIG. 4 is a second schematic view of an embodiment of a method for preparing nano-scale platinum in accordance with the present invention.
Figure 5:
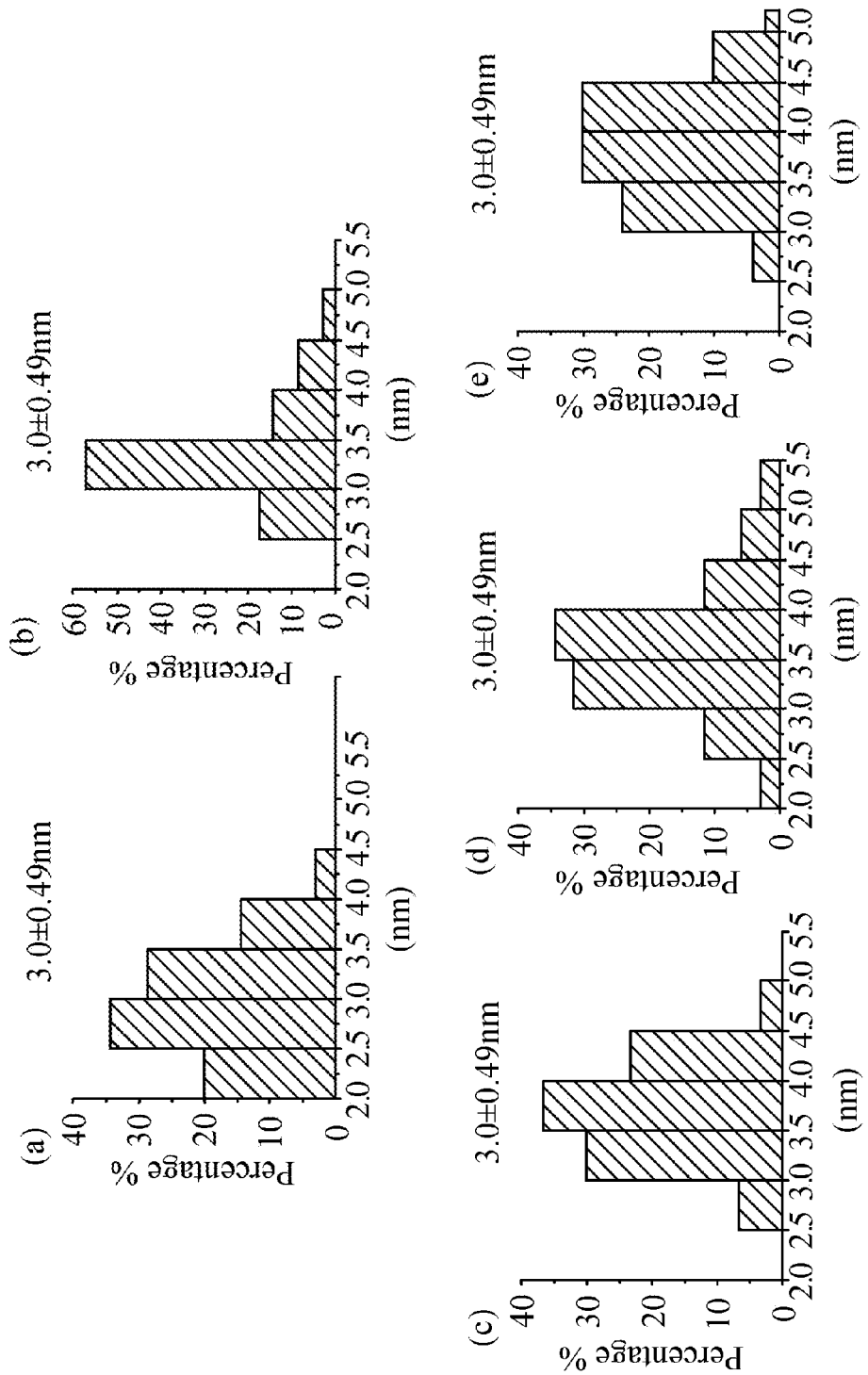
FIG. 5 is a third schematic view of an embodiment of a method for preparing nano-scale platinum in accordance with the present invention.

With reference to FIG. 4 for a second schematic view of an embodiment of a method for preparing nano-scale platinum in accordance with the present invention, scanning electron microscopy (SEM) micrographs show the nano-scale platinum dispersion on the carbon nanotubes at different reduction temperatures. FIG. 4(a) shows the surface configuration of the pure carbon nanotubes, and FIGS. 4(b) to 4(f) show the platinum dispersions on the carbon nanotubes, which are prepared at 110, 120, 130, 140 and 160° C. respectively. The figures also show that the loading of the nano-scale platinum particles increases with the reduction temperature and serious agglomeration of platinum clusters on the carbon nanotubes occurred at 160° C. as a result of a greater precursor concentration and a higher reduction reaction rate at this temperature. It was also confirmed that the mass density of the nano-scale platinum was proportional to the platinum reduction temperature. With reference to FIG. 5 for a third schematic view of an embodiment of a method for preparing nano-scale platinum in accordance with the present invention, FIGS. 5(a) to 5(e) show that the size distributions of the nano-scale platinum particles prepared at 110, 120, 130, 140 and 160° C., respectively. The figurers show that the nano-scale platinum prepared by the method of the present invention has a particle size distribution of 2.0-5.5 nm and a highly homogeneous dispersion of nano-scale platinum nanoparticles on carbon nanotubes with a mean size of 3.6±0.4 nm was obtained at 130° C. Accordingly, the nano-scale platinum prepared by the method of the present invention has the advantages of small size and uniform dispersion of platinum on the carbon nanotubes.

Figure 6:
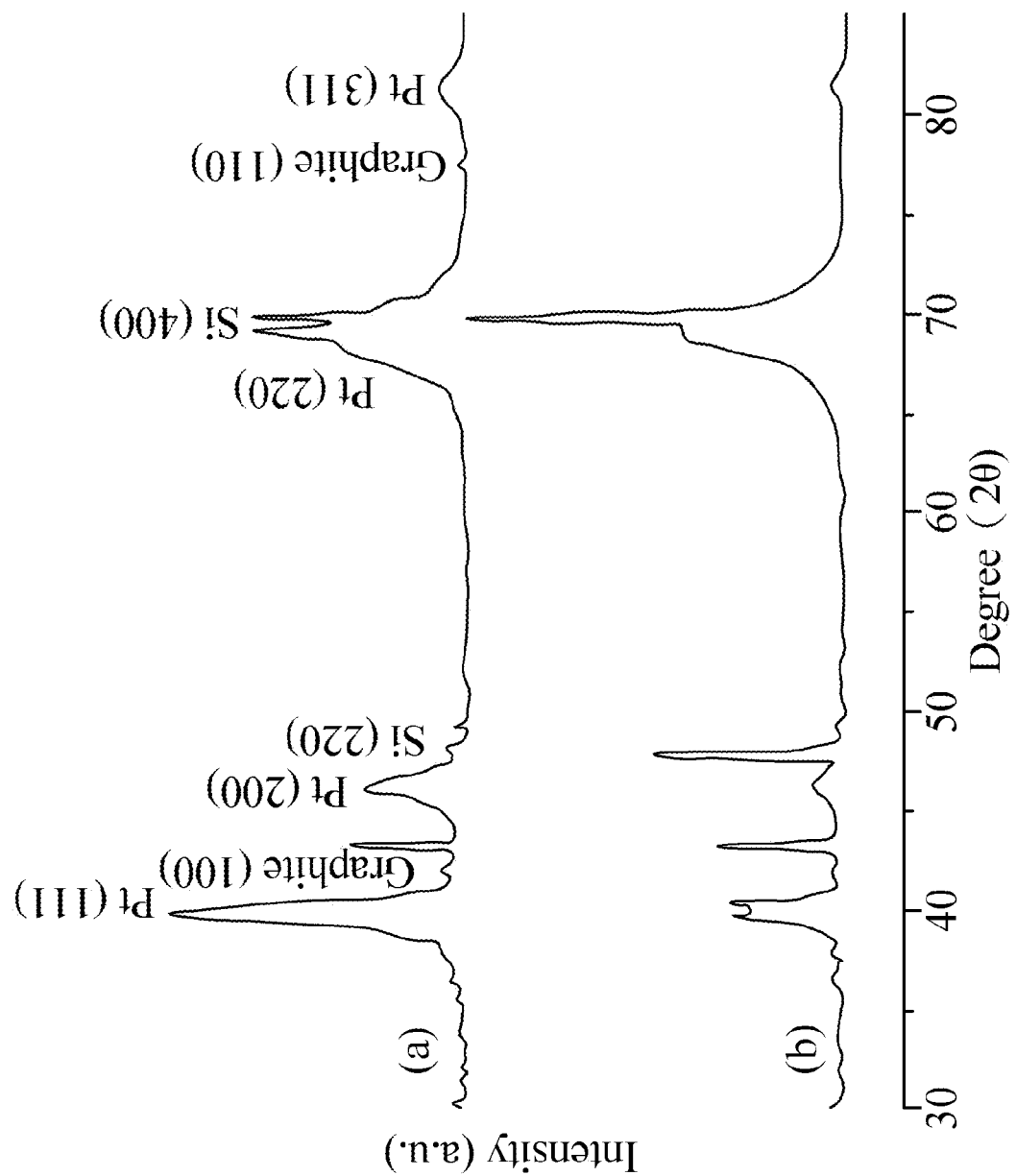
FIG. 6 is a fourth schematic view of an embodiment of a method for preparing nano-scale platinum in accordance with the present invention.

As to the nano-scale platinum electrode catalysts used in fuel cells, the preferential orientation of the nano-scale platinum is an essential factor to determine the electrocatalytic activity of the electrocatalysts in the electrochemical reaction. It is well understood that the electrocatalytic activity of the nano-scale platinum for the fuel oxidation at Pt (111) facets is higher than that at other Pt facets, the nano-scale platinum prepared at different predetermined temperatures are analyzed by x-ray diffraction (XRD). With reference to FIG. 6 for a fourth schematic view of an embodiment of a method for preparing nano-scale platinum in accordance with the present invention, FIGS. 6(a) and 6(b) show the XRD patterns of the nano-scale platinum prepared at 130° C. and 160° C., respectively (the temperature of 160° C. is used in a hermetic reflux system of the prior art). The figures show that, the nano-scale platinum prepared at 130° C. exhibits a relatively intense Pt (111) plane compared with the nano-scale platinum prepared at 160° C. As a result, the preferential orientation of Pt (111) in the nano-scale platinum electrode catalysts prepared at the temperature of 130° C. would promote the reaction current for the fuel oxidation reaction in fuel cells.

Figure 7:
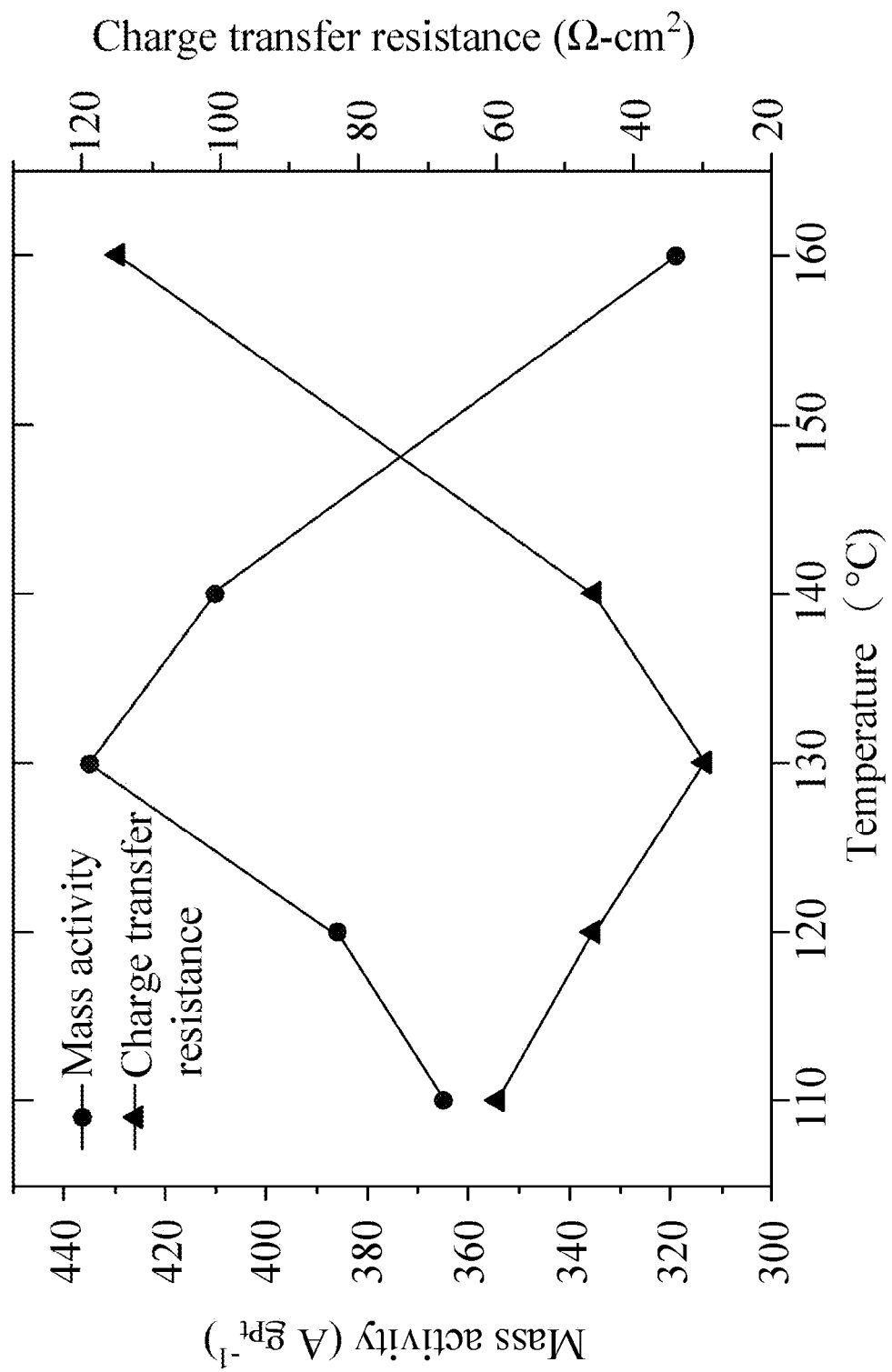
FIG. 7 is a fifth schematic view of an embodiment of a method for preparing nano-scale platinum in accordance with the present invention.

In another aspect, the nano-scale platinum supported on the carbon nanotubes are prepared at different predetermined temperatures by the method of the present invention and the prepared electrode catalysts are then analyzed by cyclic voltammetry (CV) and electrochemical impedance spectrum (EIS) to obtain the mass activity and charge transfer resistance of the nano-scale platinum. With reference to FIG. 7 for a fifth schematic view of an embodiment of a method for preparing nano-scale platinum in accordance with the present invention, the mass activity of the nano-scale platinum electrode catalysts prepared at the temperature of 130° C. by the method of the invention reaches 435 A $g_{Pt}^{-1}$, which is higher than those of the prior art (100-360 A $g_{Pt}^{-1}$), Furthermore, the charge transfer resistance of the nano-scale platinum electrode catalysts is less than 30 Ω-cm², which is lower than those of the prior art (40-80 Ω-cm²). More specifically, the maximum mass activity and minimum charge transfer resistance of the nano-scale platinum electrode catalysts are obtained at the predetermined temperature of 130° C. Thus, it is known that the predetermined temperature of the method of the present invention is preferably 130° C.

As described above, the method for preparing nano-scale platinum is mainly to heat the precursor solution formed with carbon nanotubes, platinum salt, a reducing agent and deionized water in the flask at the predetermined temperature so as to boil and evaporate water therein, and prevent any vapor to flow back into the flask. Then, the concentration of the reducing agent in the precursor solution in the flask would be gradually increased, thereby accelerating the platinum reduction and shortening the reduction time for the preparation of the nano-scale platinum. Compared with the prior art, the prepared by the method of the present invention has the advantages of simple, rapid and highly efficient nano-scale platinum preparation with small size and uniform particle dispersion on the carbon nanotubes and superior electrochemical properties.

Even though numerous characteristics and advantages of the present invention have been set forth in the foregoing description, the disclosure is illustrative only, but not intended for limiting the scope of the invention. Changes may be made in details, and arrangement of parts within the principles of the invention to the full extent indicated by the broad general meaning of the terms in which the appended claims are expressed.

What is claimed is:

1. A method for preparing nano-scale platinum (Pt), comprising the steps of:
    utilizing carbon nanotubes (CNTs) as a catalyst support; and
    mixing platinum salt, a reducing agent and deionized water to form a precursor solution in a flask;
    heating the precursor solution in said flask at a predetermined temperature to reduce nano-scale platinum particles on said carbon nanotubes by a process of water evaporation;
    allowing water vapor to flow through a connection tube to a condenser; and
    using the condenser with a cooling substance to condense the water vapor into liquid water, and allowing the liquid water to flow out of the condenser through an output opening of the condenser.

2. The method as claimed in claim 1, wherein the condenser has an inner tube, a first opening and a second opening, and the method further comprises a step of:
    allowing the water vapor to flow through the inner tube, filling the cooling substance into the condenser via the first opening and draining the cooling substance from the condenser via the second opening to lower the temperature of the water vapor in the inner tube and condense the water vapor into liquid water by using the cooling substance.

3. The method as claimed in claim 1, wherein the predetermined temperature range is from 110 to 160° C.

4. The method as claimed in claim 1, wherein the reduction time of the nano-scale platinum is less than 1.5 hours.

5. The method as claimed in claim 1, wherein mass activity of the nano-scale platinum is 435 A $g_{Pt}^{-1}$.

6. The method as claimed in claim 1, wherein charge transfer resistance of the nano-scale platinum is less than 30 $\Omega\text{-cm}^2$.

7. The method as claimed in claim 1, wherein an average diameter of the nano-scale platinum particles is 3.6±0.4 nm.

8. The method as claimed in claim 1, wherein mass density of the nano-scale platinum is less than 0.2 mg cm$^{-2}$.

9. The method as claimed in claim 1, wherein a particle size distribution of the nano-scale platinum is 2.0 to 5.5 nm.

10. The method as claimed in claim 1, wherein the reducing agent comprises formaldehyde, paraformaldehyde, sodium borohydride, sodium thiosulfate, sodium sulfite, ethanol, ethylene glycol, citric acid or glucose.

\* \* \* \* \*